United States Patent Office 3,153,065
Patented Oct. 13, 1964

3,153,065
16-HALO ESTROGENS
Albert Bowers and Pierre Crabbé, Mexico City, Mexico, assignors, by mesne assignments, to Syntex Corporation, a corporation of Panama
No Drawing. Filed Mar. 1, 1962, Ser. No. 176,772
20 Claims. (Cl. 260—397.45)

The present invention relates to novel cyclopentanophenanthrene derivatives and to a process for the production thereof.

More particularly the present invention relates to novel 16-halo-$\Delta^{1,3,5(10),9(11)}$-estratetraene derivatives.

The novel compounds of the present invention are represented by the following formulas:

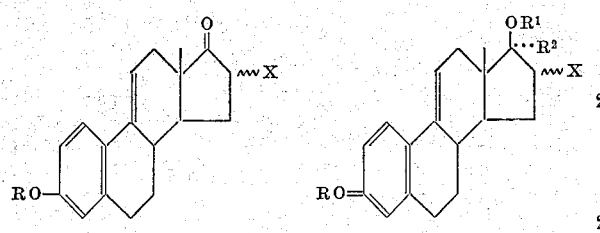

In the above formulas R represents hydrogen, lower alkyl or a hydrocarbon carboxylic acyl group of less than 12 carbon atoms; $R^1$ represents hydrogen or a hydrocarbon carboxylic acyl group of less than 12 carbon atoms; $R^2$ represents hydrogen, lower alkyl, lower alkenyl, or lower alkynyl and X represents halogen. The wavy line at C–16 indicates that the substituent is in the $\alpha$ or $\beta$ position. The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The compounds represented by the above formulas are very valuable in arresting calcium excretion as in certain osteoporosis conditions, having very low estrogenic activities. In addition they lower the level of blood and adrenal cholesterol, are useful in the treatment of arteriosclerosis and reduce bleeding considerably after surgical treatment such as dental extractions, tonsillectomies, etc.

The novel compounds of the present invention are prepared by the process exemplified by the following equation:

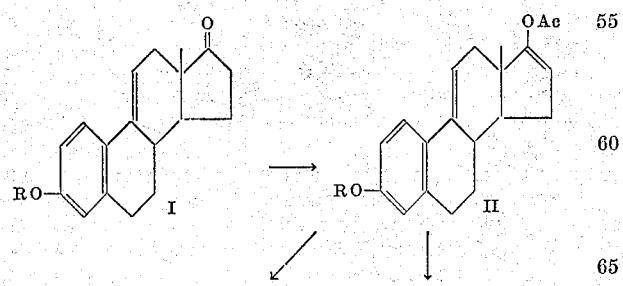

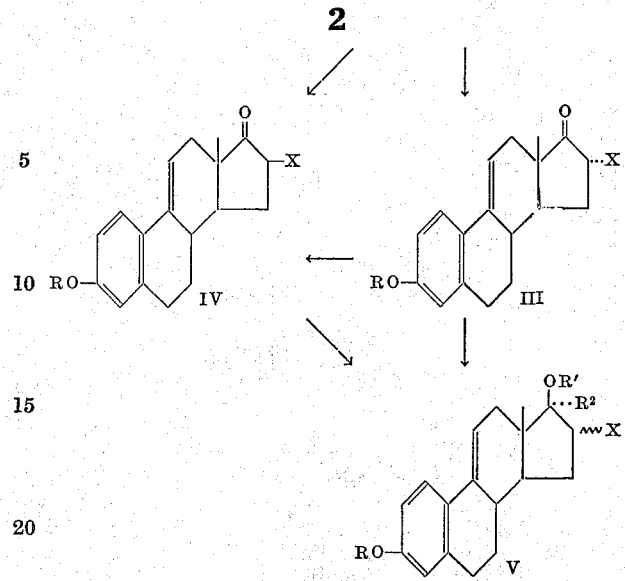

In the above formulas R, $R^1$, $R^2$ and X have the same meaning as previously defined and Ac represents the acyl group, preferably the acetyl radical.

In practicing the process outlined above the starting compound (I) which is selected from the group consisting of $\Delta^{9(11)}$-dehydroestrone, the 3-lower alkyl ethers or the 3-acylates thereof, are treated with isopropenyl acetate in the presence of p-toluenesulfonic acid at reflux temperature for a period of time of the order of 24 hours to give the corresponding 17-enol ester (II). This enol ester upon treatment with approximately 1 molar equivalent of an N-(chloro or bromo) amide such as N-(chloro or bromo) succinimide yields the corresponding 16$\alpha$-chloro- or bromo-17-keto compound (III: X=chlorine or bromine). The same enol ester when treated with an N-iodo-amide, such as N-iodo succinimide gives the corresponding 16$\alpha$ and 16$\beta$-iodo-17-keto compounds (III and IV: X=iodine).

The 16$\beta$-fluoro derivative (IV: X=fluorine) are obtained from the corresponding 16$\alpha$-iodo compounds by treatment with silver fluoride in a suitable solvent such as acetonitrile. The 16$\alpha$-fluoro derivatives (III: X=fluorine) are produced by treatment of the corresponding 17-enol esters (II) with perchloryl fluoride in a suitable solvent such as dimethylformamide. The 16$\alpha$-iodo and 16$\alpha$-bromo compounds, upon reaction with alkali metal halides, preferably lithium halides in a suitable solvent such as dimethylformamide afford the corresponding 16$\beta$-halo derivatives (IV).

The 16$\alpha$-halo and 16$\beta$-halo-17-ketones (III and IV) are reduced, preferably with sodium borohydride, to produce the corresponding 16-halo-17$\beta$-alcohols (V:$R^1$=$R^2$=H)

The same 16-halo-17-ketones (III and IV) upon reaction with a lower alkyl magnesium halide, such as methyl magnesium bromide, yield the corresponding 16-halo-17$\alpha$-lower alkyl-17$\beta$-alcohols (V:$R^1$=H; $R^1$=lower alkyl).

The aforementioned 16-halo-17-ketones (III and IV) upon treatment with a 1-lower alkyne such as acetylene in the presence of potassium t-amyloxide yield the corresponding 16-halo-17$\alpha$-lower alkynyl-17$\beta$-alcohols (V:$R^1$=H; $R^2$=lower alkynyl) which are hydrogenated in the presence of a suitable catalyst such as 2% palladium-on calcium carbonate, to produce the corresponding 17α-lower-alkenyl derivatives (V:$R^1$=H, $R^2$=lower alkenyl).

The secondary 17β-alcohols of the present invention (V:$R^1$=$R^2$=H) are conventionally acylated in pyridine with an acylating agent such as an anhydride derived from a hydrocarbon carboxylic acid of the hereinbefore defined type, to produce the corresponding 17β-acylates (V:$R^1$=acyl, $R^2$=H).

The tertiary 17β-alcohols of the present invention (V:$R^1$=H, $R^2$=lower aliphatic hydrocarbon) are conventionally acylated in the presence of p-toluenesulfonic acid with an acylating agent, e.g., acetic anhydride or propionic anhydride, to give the corresponding 17α-substituted-17β-acylates (V:$R^1$=acyl, $R^2$=lower aliphatic hydrocarbon).

The following specific examples serve to illustrate, but are not intended to limit the scope of the present invention:

*Example I*

A mixture of 1.2 g. of $\Delta^{9(11)}$-dehydroestrone-3-methyl ether (Magerlein et al. J. Am. Chem. Soc., 80, 2220 (1958)), 20 cc. of isopropenyl acetate and 60 mg. of paratoluenesulfonic acid was refluxed using an air condenser so that approximately 2 cc. of solvent distilled off over a period of 30 minutes.

A water-cooled condenser was then substituted for the air condenser and reflux continued for 24 hours.

The cooled solution was diluted with ethyl acetate, washed with water, aqueous sodium bicarbonate, and then with water until neutral.

The organic solution was dried with sodium sulfate, evaporated to dryness, and the product crystallized from methylene chloride-hexane, thus furnishing 3-methoxy-17-acetoxy-$\Delta^{1,3,5(10),9(11),16}$-estrapentaene.

*Example II*

1 g. of 3-methoxy-17-acetoxy-$\Delta^{1,3,5(10),9(11),16}$-estrapentaene in 25 cc. of dioxane, containing a few drops of 70% aqueous perchloric acid, was kept at room temperature with 1.1 molar equivalents of N-bromosuccinimide for 24 hours. The mixture was filtered to eliminate the succinimide that is formed during the reaction. The filtrate was diluted with water and the product was extracted with methylene chloride. The extract was washed with dilute sodium bicarbonate, then with water, dried and evaporated to dryness. The residue was washed with water, dried and recrystallized from acetone-hexane to give 3-methoxy-16α-bromo-$\Delta^{1,3,5(10),9(11)}$-estratetraen-17-one.

*Example III*

1 g. of 3-methoxy-17-acetoxy-$\Delta^{1,3,5(10),9(11),16}$-estrapentaene was treated following the procedure described in Example II, except that N-bromosuccinimide was substituted by N-chlorosuccinimide, thus affording 3-methoxy-16α-chloro-$\Delta^{1,3,5(10),9(11)}$-estratetraen-17-one.

*Example IV*

1 g. of 3-methoxy-17-acetoxy-$\Delta^{1,3,5(10),9(11),16}$-estrapentaene was treated in accordance with Example II with the exception that N-bromosuccinimide was substituted by N-iodosuccinimide, thus giving 3-methoxy-16α-iodo-$\Delta^{1,3,5(10),9(11)}$-estratetraen-17-one.

*Example V*

A solution of 5 g. of 3-methoxy-16α-iodo-$\Delta^{1,3,5(10),9(11)}$-estratetraen-17-one in 125 cc. of acetonitrile was refluxed for 16 hours in a Soxhlet apparatus containing 25 g. of silver fluoride. The mixture was cooled to room temperature, the suspended silver salts filtered off and the filtrate diluted with 250 cc. of chloroform. The resulting solution was washed with water, dried over sodium sulfate and evaporated to dryness. The residue upon chromatography and recrystallization of the solid fractions yielded pure 3-methoxy-16β-fluoro-$\Delta^{1,3,5(10),9(11)}$-estratetraen-17-one.

*Example VI*

To a solution of 2 g. of 3-methoxy-16α-bromo-$\Delta^{1,3,5(10),9(11)}$-estratetraen-17-one in 100 cc. of dimethylformamide were added 7 g. of lithium bromide and the resulting mixture was stirred at room temperature for 24 hours. The solution was diluted with water, the formed precipitate separated by filtration and recrystallized from methanol thus yielding 3-methoxy-16β-bromo-$\Delta^{1,3,5(10),9(11)}$-estratetraen-17-one.

*Example VII*

3-methoxy-16α-iodo-$\Delta^{1,3,5(10),9(11)}$-estratetraen-17-one was treated in accordance with Example VI, but using lithium chloride instead of lithium bromide, furnishing 3-methoxy-16β-chloro-$\Delta^{1,3,5(10),9(11)}$-estratetraen-17-one.

*Example VIII*

3-methoxy-16α-bromo-$\Delta^{1,3,5(10),9(11)}$-estratetraen-17-one was treated according to Example VI, except that lithium bromide was substituted by lithium chloride thus giving 3-methoxy-16β-chloro-$\Delta^{1,3,5(10),9(11)}$-estratetraen-17-one.

*Example IX*

3-methoxy-16α-iodo-$\Delta^{1,3,5(10),9(11)}$-estratetraen-17-one was treated by the technique described in Example VI, except that lithium bromide was substituted by lithium fluoride to produce 3-methoxy-16β-fluoro-$\Delta^{1,3,5(10),9(11)}$-estratetraen-17-one.

*Example X*

$\Delta^{9(11)}$-dehydroestrone (Magerlein et al. v. supra) was successively treated in accordance with Examples I and II, producing respectively 3,17-diacetoxy-$\Delta^{1,3,5(10),9(11),16}$-estrapentaene and 3-acetoxy-16α-bromo-$\Delta^{1,3,5(10),9(11)}$-estratetraen-17-one.

*Example XI*

3,17-diacetoxy-$\Delta^{1,3,5(10),9(11),16}$-estrapentaene was treated in accordance with Examples III and IV giving respectively 3-acetoxy-16α-chloro-$\Delta^{1,3,5(10),9(11)}$-estratetraen-17-one and 3-acetoxy-16α-iodo-$\Delta^{1,3,5(10),9(11)}$-estratetraen-17-one.

*Example XII*

1 g. of 3-methoxy-17-acetoxy-$\Delta^{1,3,5(10),9(11),16}$-estrapentaene was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness.

Upon chromatography over washed alumina there was isolated 3-methoxy-16α-fluoro-$\Delta^{1,3,5(10),9(11)}$-estratetraen-17-one.

*Example XIII*

A solution of 5 g. of 3-methoxy-16α-bromo-$\Delta^{1,3,5(10),9(11)}$-estratetraen-17-one in 250 cc. of thiophene-free benzene was treated with 27.5 cc. of 4N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3-methoxy-16α-bromo-17α-methyl-$\Delta^{1,3,5(10),9(11)}$-estratetraen-17β-ol.

Following the same procedure there were treated the starting compounds under I, thus giving the corresponding products under II.

| I | II |
|---|---|
| 3-methoxy-16α-chloro-Δ$^{1,3,5(10),9(11)}$-estratetraen-17-one. | 3-methoxy-16α-chloro-17α-methyl-Δ$^{1,3,5(10),9(11)}$-estratetraen-17β-ol. |
| 3-methoxy-16α-iodo-Δ$^{1,3,5(10),9(11)}$-estratetraen-17-one. | 3-methoxy-16α-iodo-17α-methyl-Δ$^{1,3,5(10),9(11)}$-estratetraen-17β-ol. |
| 3-methoxy-16α-fluoro-Δ$^{1,3,5(10),9(11)}$-estratetraen-17-one. | 3-methoxy-16α-fluoro-17α-methyl-Δ$^{1,3,5(10),9(11)}$-estratetraen-17β-ol. |
| 3-methoxy-16β-iodo-Δ$^{1,3,5(10),9(11)}$-estratetraen-17-one. | 3-methoxy-16β-iodo-17α-methyl-Δ$^{1,3,5(10),9(11)}$-estratetraen-17β-ol. |
| 3-methoxy-16β-bromo-Δ$^{1,3,5(10),9(11)}$-estratetraen-17-one. | 3-methoxy-16β-bromo-17α-methyl-Δ$^{1,3,5(10),9(11)}$-estratetraen-17β-ol. |
| 3-methoxy-16β-chloro-Δ$^{1,3,5(10),9(11)}$-estratetraen-17-one. | 3-methoxy-16β-chloro-17α-methyl-Δ$^{1,3,5(10),9(11)}$-estratetraen-17β-ol. |
| 3-methoxy-16β-fluoro-Δ$^{1,3,5(10),9(11)}$-estratetraen-17-one. | 3-methoxy-16β-fluoro-17α-methyl-Δ$^{1,3,5(10),9(11)}$-estratetraen-17β-ol. |
| 3-acetoxy-16α-bromo-Δ$^{1,3,5(10),9(11)}$-estratetraen-17-one. | 16α-bromo-17α-methyl-Δ$^{1,3,5(10),9(11)}$-estratetraen-3,17β-diol. |
| 3-acetoxy-16α-chloro-Δ$^{1,3,5(10),9(11)}$-estratetraen-17-one. | 16α-chloro-17α-methyl-Δ$^{1,3,5(10),9(11)}$-estratetraen-3,17β-diol. |

Example XIV

A solution of 1 g. of 3-methoxy-16α-bromo-Δ$^{1,3,5(10),9(11)}$-estratetraen-17-one in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded the pure 3-methoxy-16α-bromo-17α-ethinyl-Δ$^{1,3,5(10),9(11)}$-estratetraen-17β-ol.

Using exactly the same conditions there were treated the starting compounds under I, thus yielding the corresponding products under II.

| I | II |
|---|---|
| 3-methoxy-16α-chloro-Δ$^{1,3,5(10),9(11)}$-estratetraen-17-one. | 3-methoxy-16α-chloro-17α-ethinyl-Δ$^{1,3,5(10),9(11)}$-estratetraen-17β-ol. |
| 3-methoxy-16α-iodo-Δ$^{1,3,5(10),9(11)}$-estratetraen-17-one. | 3-methoxy-16α-iodo-17α-ethinyl-Δ$^{1,3,5(10),9(11)}$-estratetraen-17β-ol. |
| 3-methoxy-16α-fluoro-Δ$^{1,3,5(10),9(11)}$-estratetraen-17-one. | 3-methoxy-16α-fluoro-17α-ethinyl-Δ$^{1,3,5(10),9(11)}$-estratetraen-17β-ol. |
| 3-methoxy-16β-iodo-Δ$^{1,3,5(10),9(11)}$-estratetraen-17-one. | 3-methoxy-16β-iodo-17α-ethinyl-Δ$^{1,3,5(10),9(11)}$-estratetraen-17β-ol. |
| 3-methoxy-16β-bromo-Δ$^{1,3,5(10),9(11)}$-estratetraen-17-one. | 3-methoxy-16β-bromo-17α-ethinyl-Δ$^{1,3,5(10),9(11)}$-estratetraen-17β-ol. |
| 3-methoxy-16β-chloro-Δ$^{1,3,5(10),9(11)}$-estratetraen-17-one. | 3-methoxy-16β-chloro-16α-ethinyl-Δ$^{1,3,5(10),9(11)}$-estratetraen-17β-ol. |
| 3-methoxy-16β-fluoro-Δ$^{1,3,5(10),9(11)}$-estratetraen-17-one. | 3-methoxy-16β-fluoro-17α-ethinyl-Δ$^{1,3,5(10),9(11)}$-estratetraen-17β-ol. |
| 3-acetoxy-16α-bromo-Δ$^{1,3,5(10),9(11)}$-estratetraen-17-one. | 16α-bromo-17α-ethinyl-Δ$^{1,3,5(10),9(11)}$-estratetraen-3,17β-diol. |
| 3-acetoxy-16α-chloro-Δ$^{1,3,5(10),9(11)}$-estratetraen-17-one. | 16α-chloro-17α-ethinyl-Δ$^{1,3,5(10),9(11)}$-estratetraen-3,17β-diol. |

Example XV

A solution of 1 g. of 3-methoxy-16α-bromo-17α-ethinyl-Δ$^{1,3,5(10),9(11)}$-estratetraen-17β-ol in 40 cc. of pyridine was hydrogenated at 25° C. and 570 mm. in the presence of 400 mg. of pre-hydrogenated 2% palladium calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 3-methoxy-16α-bromo-17α-vinyl-Δ$^{1,3,5(10),9(11)}$-estratetraen-17β-ol.

By the same procedure, the rest of the final compounds of Example XIV were converted into the corresponding 17α-vinyl derivatives.

Example XVI

A solution of 1 g. of sodium borohydride in 3 cc. of water was added to an ice-cooled solution of 1 g. of 3-methoxy-16α-bromo-Δ$^{1,3,5(10),9(11)}$-estratetraen-17-one in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 3-methoxy-16α-bromo-Δ$^{1,3,5(10),9(11)}$-estratetraen-17β-ol.

Following the above procedure there were treated the starting compounds under I, to produce the products under II.

| I | II |
|---|---|
| 3-methoxy-16α-chloro-Δ$^{1,3,5(10),9(11)}$-estratetraen-17-one. | 3-methoxy-16α-chloro-Δ$^{1,3,5(10),9(11)}$-estratetraen-17β-ol. |
| 3-methoxy-16α-iodo-Δ$^{1,3,5(10),9(11)}$-estratetraen-17-one. | 3-methoxy-16α-chloro-Δ$^{1,3,5(10),9(11)}$-estratetraen-17β-ol. |
| 3-methoxy-16α-fluoro-Δ$^{1,3,5(10),9(11)}$-estratetraen-17-one. | 3-methoxy-16α-fluoro-Δ$^{1,3,5(10),9(11)}$-estratetraen-17β-ol. |
| 3-methoxy-16β-iodo-Δ$^{1,3,5(10),9(11)}$-estratetraen-17-one. | 3-methoxy-16β-iodo-Δ$^{1,3,5(10),9(11)}$-estratetraen-17β-ol. |
| 3-methoxy-16β-bromo-Δ$^{1,3,5(10),9(11)}$-estratetraen-17-one. | 3-methoxy-16β-bromo-Δ$^{1,3,5(10),9(11)}$-estratetraen-17β-ol. |
| 3-methoxy-16β-chloro-Δ$^{1,3,5(10),9(11)}$-estratetraen-17-one. | 3-methoxy-16β-chloro-Δ$^{1,3,5(10),9(11)}$-estratetraen-17β-ol. |
| 3-methoxy-16β-fluoro-Δ$^{1,3,5(10),9(11)}$-estratetraen-17-one. | 3-methoxy-16β-fluoro-Δ$^{1,3,5(10),9(11)}$-estratetraen-17β-ol. |
| 3-acetoxy-16α-bromo-Δ$^{1,3,5(10),9(11)}$-estratetraen-17-one. | 16α-bromo-Δ$^{1,3,5(10),9(11)}$-estratetraen-3,17β-diol. |
| 3-acetoxy-16α-chloro-Δ$^{1,3,5(10),9(11)}$-estratetraen-17-one. | 16α-chloro-Δ$^{1,3,5(10),9(11)}$-estratetraen-3,17β-diol. |

Example XVII

A mixture of 1 g. of 3-methoxy-16α-Δ$^{1,3,5(10),9(11)}$-estratetraen-17β-ol, 4 cc. of pyridine and 2 cc. of acetic anhydride was kept at room temperature overnight, poured into ice water, the formed precipitate was filtered, washed with water and dried. Crystallization from acetone-hexane gave the acetate of 3-methoxy-16α-bromo-Δ$^{1,3,5(10),9(11)}$-estratetraen-17β-ol.

By the same procedure there were treated 3-methoxy-16α-iodo-Δ$^{1,3,5(10),9(11)}$-estratetraen-17β-ol, 3-methoxy-16β-fluoro-Δ$^{1,3,5(10),9(11)}$-estraetraen-17β-ol and 16α-chloro-Δ$^{1,3,5(10),9(11)}$-estratetraen-3,17β-diol, yielding respectively, the acetate of 3-methoxy-16α-iodo-Δ$^{1,3,5(10),9(11)}$-estratetraen-17β-ol, the acetate of 3-methoxy-16β-fluoro-Δ$^{1,3,5(10),9(11)}$-estratetraen-17β-ol and the diacetate of 16α-chloro-Δ$^{1,3,5(10),9(11)}$-estratetraen-3,17β-diol.

Example XVIII

The starting compounds of Example XVII were treated by the procedure described in that example, except that acetic anhydride was substituted by propionic, anhydride, caproic anhydride and cyclopentylpropionic anhydride, thus yielding respectively the corresponding propionates, caproates and cyclopentylpropionates of said starting compounds.

Example XIX

To a solution of 5 g. of 3-methoxy-16α-bromo-17α-methyl-Δ$^{1,3,5(10),9(11)}$-estratetraen-17β-ol, in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the propionate of 3-methoxy-16α-bromo-17α-methyl-Δ$^{1,3,5(10),9(11)}$-estratetraen-17β-ol.

By the same procedure there were treated the starting compounds under I, to produce the corresponding products under II.

| I | II |
|---|---|
| 3-methoxy-16α-chloro-17α-methyl-Δ$^{1,3,5(10),9(11)}$-estratetraen-17β-ol. | The propionate of 3-methoxy-16α-chloro-17α-methyl-Δ$^{1,3,5(10),9(11)}$-estratetraen-17β-ol. |
| 3-methoxy-16α-fluoro-17α-methyl-Δ$^{1,3,5(10),9(11)}$-estratetraen-17β-ol. | The propionate of 3-methoxy-16α-fluoro-17α-methyl-Δ$^{1,3,5(10),9(11)}$-estratetraen-17β-ol. |
| 3-methoxy-16β-iodo-17α-methyl-Δ$^{1,3,5(10),9(11)}$-estratetraen-17β-ol. | The propionate of 3-methoxy-16β-iodo-17α-methyl-Δ$^{1,3,5(10),9(11)}$-estratetraen-17β-ol. |
| 3-methoxy-16β-bromo-17α-ethinyl-Δ$^{1,3,5(10),9(11)}$-estratetraen-17β-ol. | The propionate of 3-methoxy-16β-bromo-17α-ethinyl-Δ$^{1,3,5(10),9(11)}$-estratetraen-17β-ol. |
| 3-methoxy-16β-chloro-17α-ethinyl-Δ$^{1,3,5(10),9(11)}$-estratetraen-17β-ol. | The propionate of 3-methoxy-16β-chloro-17α-ethinyl-Δ$^{1,3,5(10),9(11)}$-estratetraen-17β-ol. |
| 3-methoxy-16β-fluoro-17α-ethinyl-Δ$^{1,3,5(10),9(11)}$-estratetraen-17β-ol. | The propionate of 3-methoxy-16β-fluoro-17α-ethinyl-Δ$^{1,3,5(10),9(11)}$-estratetraen-17β-ol. |
| 16α-bromo-17α-ethinyl-Δ$^{1,3,5(10),9(11)}$-estratetraen-3,17β-diol. | The dipropionate of 16α-bromo-17α-ethinyl-Δ$^{1,3,5(10),9(11)}$-estratetraen-3,17β-diol. |
| 3-methoxy-16α-bromo-17α-vinyl-Δ$^{1,3,5(10),9(11)}$-estratetraen-17β-ol. | The propionate of 3-methoxy-16α-17α-vinyl-Δ$^{1,3,5(10),9(11)}$-estratetraen-17β-ol. |

*Example XX*

The starting compounds of Example XVIII were treated in accordance with that example, but using caproic anhydride and undecenoic anhydride instead of propionic anhydride, thus giving respectively the corresponding caproates and undecenoates of said starting compounds.

*Example XXI*

2 g. of 3-acetoxy-16α-chloro-Δ$^{1,3,5(10),9(11)}$-estratetraen-17-one was dissolved in 50 cc. of methanol and treated with 1 cc. of a 50% aqueous solution of potassium hydroxide; the reaction mixture was refluxed for 2 hours; the mixture was cooled and neutralized with acetic acid and the methanol distilled under reduced pressure. The residue was triturated with water and the solid collected, washed with water, dried and recrystallized from ethyl acetate-methanol, thus producing 16α-chloro-Δ$^{1,3,5(10),9(11)}$-estratetraen-3-ol-17-one.

By the same procedure, 3-acetoxy-16α-iodo-Δ$^{1,3,5(10),9(11)}$-estratetraen-17-one was converted into 16α-iodo-Δ$^{1,3,5(10),9(11)}$-estratetraen-3-ol-17-one.

We claim:
1. A compound of the following formula:

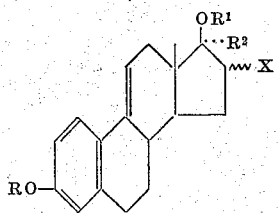

wherein X is a halogen; R is a member of the group consisting of hydrogen, a lower alkyl and a hydrocarbon carboxylic acyl group of less than 12 carbon atoms; R$^1$ is selected from the group consisting of hydrogen and a hydrocarbon carboxylic acyl group of less than 12 carbon atoms; R$^2$ is a member of the group consisting of hydrogen, lower alkyl, lower alkenyl and lower alkynyl.

2. 3-methoxy - 16α - bromo-17-α-methyl-Δ$^{1,3,5(10),9(11)}$-estratetraen-17β-ol.
3. 3-methoxy - 16α - chloro-17α-methyl-Δ$^{1,3,5(10),9(11)}$-estratetraen-17β-ol.
4. 3-methoxy - 16α - fluoro-17α-methyl-Δ$^{1,3,5(10),9(11)}$-estratetraen-17β-ol.
5. 3-methoxy - 16β - fluoro-17α-methyl-Δ$^{1,3,5(10),9(11)}$-estratetraen-17β-ol.
6. 3-methoxy - 16β - chloro - 17α-methyl-Δ$^{1,3,5(10),9(11)}$-estratetraen-17β-ol.
7. 3-methoxy - 16β - bromo-17α-methyl-Δ$^{1,3,5(10),9(11)}$-estratetraen-17β-ol.
8. 16α-bromo - 17α - methyl-Δ$^{1,3,5(10),9(11)}$-estratetraen-3,17β-diol.
9. 16α-chloro - 17α - methyl-Δ$^{1,3,5(10),9(11)}$-estratetraen-3,17β-diol.
10. 3-methoxy - 16α - bromo-17α-ethynyl-Δ$^{1,3,5(10),9(11)}$-estratetraen-17β-ol.
11. 3-methoxy - 16α - chloro-17α-ethynyl-Δ$^{1,3,5(10),9(11)}$-estratetraen-17β-ol.
12. 3-methoxy - 16α - fluoro-17α-ethynyl-Δ$^{1,3,5(10),9(11)}$-estratetraen-17β-ol.
13. 3-methoxy - 16β - fluoro-17α-ethynyl-Δ$^{1,2,5(10),9(11)}$-estratetraen-17β-ol.
14. 3-methoxy - 16β - chloro-17α-ethynyl-Δ$^{1,3,5(10),9(11)}$-estratetraen-17β-ol.
15. 3-methoxy - 16β - bromo-17α-ethynyl-Δ$^{1,3,5(10),9(11)}$-estratetraen-17β-ol.
16. A compound of the following formula:

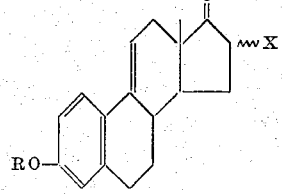

wherein X is a halogen and R is a member of the group consisting of hydrogen, a lower alkyl and a hydrocarbon carboxylic acyl group of less than 12 carbon atoms.
17. 3-methoxy - 16α-chloro-Δ$^{1,3,5(10),9(11)}$-estratetraen-17-one.
18. 3-methoxy - 16α - iodo-Δ$^{1,3,5(10),9(11)}$-estratetraen-17-one.
19. 3-methoxy - 16α - fluoro-Δ$^{1,3,5(10),9(11)}$-estratetraen-17-one.
20. 3-methoxy - 16β - chloro-Δ$^{1,3,5(10),9(11)}$-estratetraen-17-one.

References Cited in the file of this patent
UNITED STATES PATENTS

| 2,885,413 | Hogg et al. | May 5, 1959 |
| 3,076,829 | Reimann et al. | Feb. 5, 1963 |

OTHER REFERENCES

Magerlein et al.: J.A.C.S. 80, 2220 (1958).
Mueller et al.: J. Org. Chem. 26, 2403 (July 1961).